April 22, 1969    G. CORNELIUS    3,439,939
LATCH FOR IRRIGATING PIPE COUPLER
Filed Jan. 19, 1968
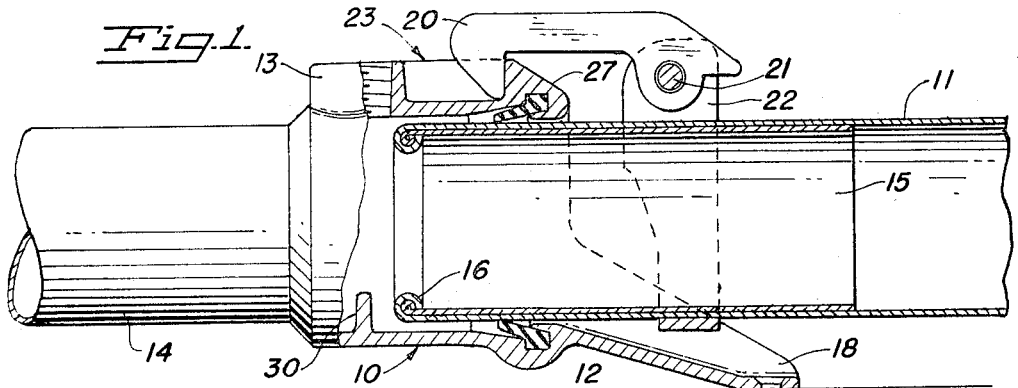
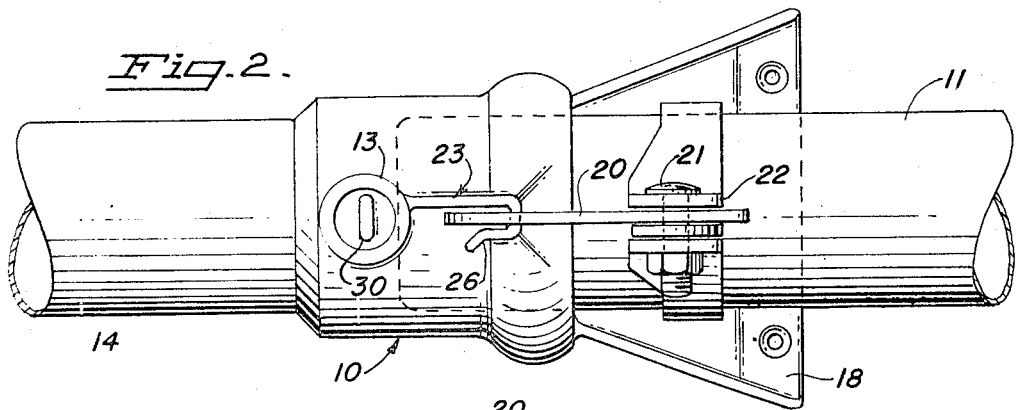
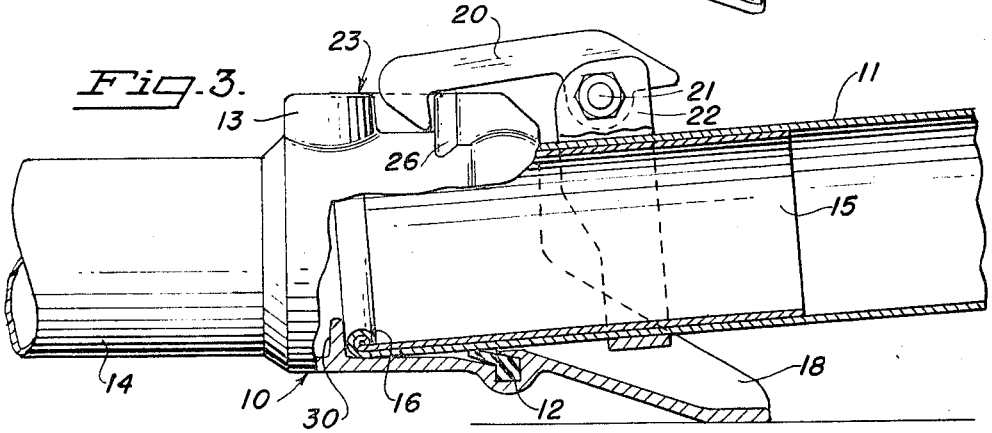
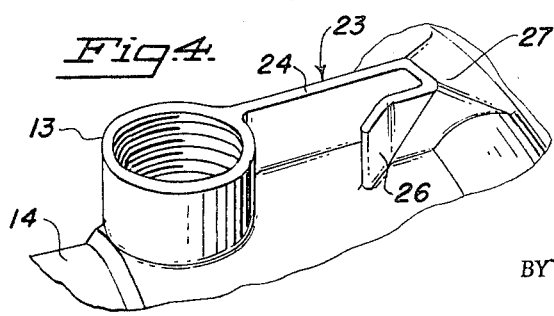
INVENTOR
GAIL CORNELIUS
BY
ATTORNEYS ed States Patent Office 3,439,939
Patented Apr. 22, 1969

3,439,939
LATCH FOR IRRIGATING PIPE COUPLER
Gail Cornelius, Washington County, Oreg., assignor to R. M. Wade & Co., Portland, Oreg., a corporation of Oregon
Filed Jan. 19, 1968, Ser. No. 699,224
Int. Cl. F16l 37/00
U.S. Cl. 285—6          3 Claims

ABSTRACT OF THE DISCLOSURE

A latch for connecting the end of a length of irrigation pipe to a coupler on the end of an adjacent length of pipe so constructed that the latch engages when the pipe is inserted into the coupler and can be disengaged by grasping the length of pipe intermediate its ends raising it and turning it, and having means to prevent disengagement when the lengths of pipe are coaxially disposed as when they are both lying on the ground.

---

A coupler of the same general type, as the one described herein, is disclosed in my U.S. Patent No. 2,677,558 which issued on May 4, 1954. It is explained in that patent that in pipelines employed for sprinkling irrigation and similar purposes, the pipe is often laid over the surface of the ground in lengths joined by couplings and is frequently moved from place to place. The couplings are usually designed to permit the pipe sections to be quickly and easily attached and detached. They must be fluid tight and preferably sufficiently loose or flexible to permit the pipe to follow the regular terrain and gradual curves. All this is accomplished by the use of a coupling larger in diameter than the external diameter of the pipe and flexible gaskets in the coupling to make a fluid tight joint when the pipe is inserted thereinto.

The lengths of pipe which form the pipeline are coupled and uncoupled manually, and preferably through some simple coupling and latching means which enables a worker to manipulate the end of the long length of pipe into its coupled position as he carries or holds the pipe at a point intermediate its ends, thus saving time and labor which would be required if it were necessary for the workman to first lay the pipe on the ground and then walk to its end for inserting it and latching it into its place.

With the latch disclosed in the patent referred to above, disengagement is accomplished by thrusting the pipe inwardly of the coupling and turning it to one side. There is generally a stand pipe and sprinkler head for each length of pipe in a sprinkling system, and their weight tends to cause the pipe to roll to one side or the other in the absence of pressure in the line. This can cause disengagement of the latch just described, and subsequent introduction of pressure will cause separation at the coupler. This takes place unless special care has been taken to arrange the pipe in a prescribed manner.

It is the object of the present invention to provide an improved latch of the kind described with means to cause automtic latching when the pipe is inserted into the coupler and means to prevent release of the latch or sidewise rolling of the length of pipe that is latched except when the length of pipe is grasped and raised so that it is disposed at an angle to the length of pipe to which it was coupled.

A further and more complete understanding of the invention may be had from the following specifications describing the invention in detail by reference to the accompanying drawing.

In the drawing:

FIG. 1 is a view in elevation with parts shown in section of a pipe coupler including latching means embodying the present invention;

FIG. 2 is a plan view of the coupler shown in FIG. 1 with the latch engaged as in FIG. 1;

FIG. 3 is another view in side elevation with parts in section showing the relative positions assumed by the lengths of pipe in order to move the latching means to a position where it may be unlatched; and FIG. 4 is a fragmentary perspective view of a part of the latching means.

In the drawing, a pipe coupler generally indicated at 10 as a substantially tubular casting into one end of which the end of a pipe 11 may be inserted to provide for the continuous flow of water or other fluid through sections of pipe which form a pipeline. Gaskets such as indicated at 12 in FIGS. 1 and 3 are provided in the ends of the couplings at 10 to form a fluid tight seal between each coupling and the end of the pipe which extends into it. The coupling herein shown is provided with a threaded outlet 13 which generally serves as means to receive a standpipe and sprinkler.

At one end the coupling is designed for reception of an end of a pipe shown at 14, which is generally welded or otherwise suitably secured to the coupling. The inserted pipe 11 is provided with a conventional thin tubular member 15, and the extreme end of the pipe is rolled over this tubular member as shown at 16 as reinforced means for the end of the pipe. An apron 18 extends from one end of the coupling to rest on the ground and provide a ramp to guide the end of the pipe 11 as it is inserted into the coupling. It is the latch and associated means at this end of the coupling that forms the subject matter of the present invention.

The new latch comprises a pawl 20 pivotally secured as by a bolt 21 to a split collar 22 which embraces the pipe 11. The hooked end of the pawl 20 is adapted to be received within a recess generally indicated at 23 formed on the top of the coupling. As is most clearly shown in FIG. 4 of the coupling, the recess is formed with a long wall 24 on one side and a short wall having a slight outward flare 26 at its other side. As the pipe 11 is being inserted toward the position shown in FIG. 1, the nose of the pawl rides up a ramp 27 until it falls into the latching position illustrated in FIGS. 1 and 2. In this position, relative rotation between the pipe 11 and the coupling is prevented.

Unlatching to permit removal of pipe 11 is accomplished by advancing the pipe into the coupling to a point where the nose of the pawl extends beyond the short wall 26 so that twisting of the pipe 11 about its axis in a counterclockwise direction will release the pawl from the recess and permit retraction of the pipe. This advancing of the pipe is normally prevented or limited by a lug formed interiorly of the coupling and shown at 30 in FIG. 1. As can be observed from FIGS. 1 and 2, insertion of the pipe 11 into the coupling to the point where its end abuts the lug 30 will be just insufficient to advance the nose of the pawl 20 to a point where it may be rotated in a counterclockwise direction. This condition exists when the pipes are in substantially coaxial positions as when the sprinkler is resting on the ground. However, with the end of pipe 11 abutting lug 30 as shown in FIG. 3 and with the pipe raised as by an attendant grasping it at its central portion and lifting it from the ground, the upper portion of the pipe is in effect moved inwardly of the coupler until the nose of the pawl extends just beyond the end of the short wall 26 and counterclockwise rotation of the pipe will cause removal of the pawl from the recess 23.

With the construction above described, a long irrigation line is assembled from individual lengths of pipe by an attendant, carrying the pipe at a point intermediate its end, who inserts the end of the pipe into a coupling already disposed on the ground and then lowers the pipe to the ground. Even if he has inserted the pipe until its end contacts the lug 30, lowering of the pipe will cause it to recede to a point where the nose of the latch is retained against sidewise movement. The introduction of fluid under pressure into the pipe generally tends to move the parts to the positions illustrated in FIGS. 1 and 2. Here the pipe is latched against withdrawal or against rotation in either direction, and it is only when the attendant wishes to disassemble the line for movement to a new location that the pipe is raised to the position of FIG. 3 enabling release of the latching means.

What is claimed is:

1. In a pipe coupler including a coupling member receiving a pipe end and having walls on its upper exterior portion forming a longitudinally extending recess receiving a pawl pivotally supported by the end of the coupling member, said pawl being into the recess, when said pipe end is inserted into said coupling member, engaging a wall of said recess thereby latching the pipe and coupling member against separation, and in which a side wall of the recess has an opening remote from the said end of the coupling member to permit latch release when the pipe and pawl are moved inwardly and rotated, the improvement which comprises means to limit inward movement of the pipe and so to prevent said pawl from being positioned opposite said opening in said side wall thereby preventing release, and operable upon lifting the pipe to a position angularly related to the coupling member to advance the pawl opposite said opening in said side wall to a release position.

2. The combination of claim 1 in which the improvement recited includes a lug within the coupling member positioned for engagement by the end of the pipe.

3. The combination of claim 2 in which the lug is positioned for engagement by the pipe only at the lower edge thereof whereby upon raising of the pipe it will pivot about its contact with the lug and the upper edge of the pipe and the pawl will move inwardly of the pipe to a point where rotation will effect release.

References Cited

UNITED STATES PATENTS

| | | | |
|---|---|---|---|
| 2,355,407 | 8/1944 | Wyss | 285—6 |
| 2,677,558 | 5/1954 | Cornelius | 285—6 |
| 2,879,082 | 3/1959 | Cornelius | 285—6 |
| 3,331,620 | 7/1967 | Rickard | 285—5 |

CARL W. TOMLIN, *Primary Examiner.*

D. W. AROLA, *Assistant Examiner.*

U.S. Cl. X.R.

285—307, 320

U.S. DEPARTMENT OF COMMERCE

PATENT OFFICE

Washington, D.C. 20231

UNITED STATES PATENT OFFICE
CERTIFICATE OF CORRECTION

Patent No. 3,439,939                                    April 22, 1969

Gail Cornelius

It is certified that error appears in the above identified patent and that said Letters Patent are hereby corrected as shown below:

Column 3, line 18, "and" should read -- said pawl being line 19, cancel "said pawl being".

Signed and sealed this 15th day of December 1970.

(SEAL)
Attest:

Edward M. Fletcher, Jr.                          WILLIAM E. SCHUYLER, JR.
Attesting Officer                                           Commissioner of Patents